(12) United States Patent
Fortune et al.

(10) Patent No.: US 9,523,387 B2
(45) Date of Patent: Dec. 20, 2016

(54) BEARING LININGS

(75) Inventors: Cedric Marc Roger Fortune, Pompaples (CH); Jose Valentim Lima Sarabanda, Sao Paulo (BR)

(73) Assignees: MAHLE International GmbH, Stuttgart (DE); MAHLE Composants Moteur France SAS, Chavanod (FR)

( * ) Notice: Subject to any disclaimer, the term of this patent is extended or adjusted under 35 U.S.C. 154(b) by 601 days.

(21) Appl. No.: 13/980,727

(22) PCT Filed: Jan. 20, 2012

(86) PCT No.: PCT/EP2012/000257
§ 371 (c)(1),
(2), (4) Date: Mar. 5, 2014

(87) PCT Pub. No.: WO2012/098004
PCT Pub. Date: Jul. 26, 2012

(65) Prior Publication Data
US 2014/0177988 A1 Jun. 26, 2014

(30) Foreign Application Priority Data
Jan. 21, 2011 (GB) .................................. 1101061.8

(51) Int. Cl.
*F16C 33/12* (2006.01)
*C23C 28/02* (2006.01)

(52) U.S. Cl.
CPC ............ *F16C 33/122* (2013.01); *C23C 28/02* (2013.01); *C23C 28/021* (2013.01); *C23C 28/027* (2013.01); *F16C 33/12* (2013.01); *F16C 33/125* (2013.01); *F16C 33/127* (2013.01); *F16C 2204/20* (2013.01)

(58) Field of Classification Search
None
See application file for complete search history.

(56) References Cited

U.S. PATENT DOCUMENTS

| | | | |
|---|---|---|---|
| 4,296,183 A | 10/1981 | Iwahana et al. |
| 4,916,026 A | 4/1990 | Bergmann et al. |
| 5,045,405 A | 9/1991 | Koroshetz et al. |
| 5,209,578 A | 5/1993 | Eastham et al. |

(Continued)

FOREIGN PATENT DOCUMENTS

| | | |
|---|---|---|
| EP | 0 435 980 B2 | 7/1991 |
| EP | 2 105 512 A1 | 9/2009 |

(Continued)

OTHER PUBLICATIONS

International Search Report of PCT/EP2012/000257, date of mailing Jun. 15, 2012.

(Continued)

*Primary Examiner* — Adam Krupicka
(74) *Attorney, Agent, or Firm* — Collard & Roe, P.C.

(57) ABSTRACT

A bearing lining has a bearing backing layer provided with a coating comprising a first overlay layer and a second overlay layer, the first overlay layer being provided between the bearing backing layer and the second overlay layer. The first and second overlay layers each comprise a matrix material and a soft-phase material that is substantially insoluble in the matrix and dispersed within the matrix as soft-phase particles. The first overlay layer comprises a higher proportion by weight of a grain size reduction additive than the second overlay layer.

19 Claims, 2 Drawing Sheets

(56) References Cited

U.S. PATENT DOCUMENTS

2010/0260445 A1    10/2010  Gaertner et al.

FOREIGN PATENT DOCUMENTS

| GB | 2 130 250 A | 5/1984 |
|---|---|---|
| JP | 2010-242854 A | 10/2010 |
| WO | WO 2008/074344 A1 | 6/2008 |

OTHER PUBLICATIONS

International Preliminary Report on Patentability of PCT/EP2012/000257, Jul. 23, 2013.
British Search Report dated May 19, 2011 in GB Application No. 1101061.8.

BEARING LININGS

CROSS-REFERENCE TO RELATED APPLICATIONS

This application is the National Stage of PCT/EP2012/000257filed on Jan. 20, 2012, which claims priority under 35 U.S.C. §119 of Great Britain Application No. 1101061.8 filed on Jan. 21, 2011, the disclosure of which is incorporated by reference. The international application under PCT article 21(2) was published in English.

The present invention relates to bearing linings for journaled shafts, and in particular to coatings known as overlays deposited on such bearings, for example by the technique of cathodic sputtering.

BACKGROUND

It is known to deposit soft overlay alloy compositions onto the running surface of a bearing lining by cathodic sputtering. An example of this is described in U.S. Pat. No. 5,045,405, in which an overlay based on a matrix of copper, aluminium or silver is described having columnar crystal grains with a major axis normal to the sliding direction and an embedded phase of particles which are softer than the matrix and also insoluble in the matrix metal. Examples are given of overlay compositions of AlSn20 (80% weight aluminium matrix with 20% wt of tin) and AlPb30 (70% weight aluminium matrix with 30% weight of lead).

Such two-phase composite (suspension) alloys had previously been known to be used as wrought or cast materials, as well as having been proposed for deposition by a plasma arc spraying process, as described in UK patent application GB2130250.

The use of such two-phase alloys as the overlay is attributable to the search for materials having both improved wear resistance and improved fatigue strength over conventional electro-deposited lead and tin based alloys whilst retaining good conformability (ability to accept the embedding of waste particles into the overlay) and anti-seizure properties.

However, in the initial stages of running of a new shaft in an engine, it is desirable to have a higher degree of conformability than is readily provided from known two-phase alloys, such as is described in U.S. Pat. No. 5,045,405. Furthermore, as the overlay wears and the running clearance between shaft journal and bearing increases it is desirable to provide an increasing degree of wear resistance in the overlay material, in contrast to the substantially uniform properties of U.S. Pat. No. 5,045,405. With increasing overlay wear, conformability becomes less important and wear resistance becomes more important.

European patent EP0435980 concerns an overlay with good conformability at the surface and increasing wear resistance away from the surface. It discloses a journal bearing including a strong backing material having thereon a bearing material and an overlay coating on said layer of bearing material, the overlay coating comprising a first material constituting the coating matrix and having therein a dispersed phase of a second material that is substantially insoluble in the first material, the overlay coating being deposited by cathodic sputtering. The dispersed phase of the second material has a relatively low content at the interface between the layer of bearing material and the coating, and said content continuously varying towards a relatively high content at the coating surface, the total thickness of said overlay coating being in the range from 10 to 50 µm.

EP0435980 discloses an exemplary embodiment of an overlay coating comprising: an aluminium-tin composite material having a first layer of substantially pure aluminium and a thickness of approximately 2 µm; adjacent the first layer is an intermediate layer having an aluminium matrix with dispersed particles of tin therein, in which the intermediate layer has a composition of approximately aluminium with 10 wt % tin adjacent the first layer and incrementally rising steadily in tin content to approximately 50 wt % tin at a thickness of approximately 22 µm; the coating has, as a surface layer, a layer of substantially pure tin approximately 2 µm thick.

It is known that increasing the proportion of soft-phase (e.g. the proportion of tin to aluminium) in the matrix towards the surface of the coating increases the gain size of the soft-phase dispersed in the matrix, which reduces the hardness and increases the conformability of the coating towards the surface (away from the bearing backing). However, disadvantageously the manufacture of such a bearing lining requires sophisticated deposition apparatus operating complex manufacturing procedures in which the proportion of soft-phase deposited requires to be accurately controlled in real-time during the deposition process, with adverse implications for cost, manufacturing reliability and yield, and the manufacturing throughput of each deposition apparatus.

Alternatively, it is also known to increase the grain size of tin particles suspended within an aluminium-based matrix, over the course of the coating deposition, by increasing the temperature of the bearing backing during the sputter deposition, as is disclosed in U.S. Pat. No. 4,916,026. However, disadvantageously, the manufacture of such a bearing lining requires sophisticated deposition apparatus operating complex manufacturing procedures in which the temperature requires to be accurately controlled in real-time during the deposition process, with adverse implications for cost, manufacturing reliability and yield, and the manufacturing throughput of each deposition apparatus. Further, disadvantageously, differences in heat capacity will affect the required temperature control of the bearing lining during the deposition process so that different deposition processes will be required for different sizes of bearing linings, and even for nominally identical bearing linings using the same deposition process there will be variations in the characteristics of the deposited coatings due to the manufacturing tolerances of the bearing lining.

A particular challenge to bearing lining performance is provided by the configuration of vehicle engines to fuel-saving stop-start operation, in which the engine is stopped each time the vehicle stops, on contrast to conventional operation in which the engine is kept running throughout a vehicle's journey. Engines configured for stop-start operation may typically restart their engines about one hundred times more frequently than conventionally configured engines run continuously throughout each vehicle journey. The particular problem that an engine configured for stop-start operation presents arises because engine bearings are conventionally hydrodynamically lubricated, with little or no lubrication initially being provided to the bearing when it starts, leading to particularly significant wear during the start-up phase.

Accordingly, a need remains in the art for an improved bearing lining coating and a corresponding manufacturing process.

SUMMARY OF THE DISCLOSURE

According to a first aspect of the invention, there is provided a bearing lining having a bearing backing layer provided with a coating comprising a first overlay layer and a second overlay layer, the first overlay layer being provided between the bearing backing layer and the second overlay layer, the first and second overlay layers each comprising a matrix material and a soft-phase material that is substantially insoluble in the matrix and dispersed within the matrix as soft-phase particles, and wherein the first overlay layer comprises a higher proportion by weight of a grain size reduction additive than the second overlay layer.

According to a second aspect of the invention, there is provided a bearing lining obtainable by the process of manufacturing a bearing lining comprising sputter depositing a first overlay layer directly or indirectly onto a bearing backing layer, sputter depositing a second overlay layer directly onto the first overlay layer, the first and second overlay layers each comprising a matrix material and a soft-phase material that is substantially insoluble in the matrix and dispersed within the matrix as soft-phase particles, and wherein the first overlay layer comprising a higher proportion by weight of a particle grain size reduction additive than the second overlay layer.

According to a third aspect of the invention, there is provided a vehicle engine comprising a bearing lining having a bearing backing layer provided with a coating comprising a first overlay layer and a second overlay layer, the first overlay layer being provided between the bearing backing layer and the second overlay layer, the first and second overlay layers each comprising a matrix material and a soft-phase material that is substantially insoluble in the matrix and dispersed within the matrix as soft-phase particles, and wherein the first overlay layer comprises a higher proportion by weight of a grain size reduction additive than the second overlay layer.

According to a fourth aspect of the invention, there is provided a process of manufacturing a bearing lining comprising sputter depositing a first overlay layer directly or indirectly onto a bearing backing layer, sputter depositing a second overlay layer directly onto the first overlay layer, the first and second overlay layers each comprising a matrix material and a soft-phase material that is substantially insoluble in the matrix and dispersed within the matrix as soft-phase particles, and wherein the first overlay layer comprising a higher proportion by weight of a grain size reduction additive than the second overlay layer.

According to a fifth aspect of the invention, there is provided a use of a grain size reduction additive to reduce the grain size of a soft-phase of a bearing coating comprising a soft-phase dispersed in a matrix.

Advantageously, the present invention may provide a bearing lining manufacturable with high reliability by a simple manufacturing process without the requirement for sophisticated deposition apparatus capable of complex real-time control during the deposition process.

The proportion of soft-phase material by weight in each of the first and second overlay layers may be less than the proportion by weight of the matrix material. The proportion of soft-phase material by weight in each of the first and second overlay layers may be no more than 35%.

The second overlay layer may comprise substantially no grain size reduction additive.

The grain size reduction additive may be one or more elements selected from a group of elements consisting of Co, Cr, Fe, Mg, Mn, Ni, Si, V and Zn.

The proportion of soft-phase material by weight in the first overlay layer may be the same as or lower than the proportion of soft-phase material by weight in the second overlay layer.

An interlayer may be provided between the bearing backing and the first overlay layer.

The interlayer may comprise a matrix and a soft-phase element that is substantially insoluble in the matrix and dispersed within the matrix as soft-phase particles.

The interlayer may comprise the same grain size reduction additive as the first overlay layer.

The interlayer may comprise a particle grain size reduction additive that is one or more element selected from a group of elements consisting of Co, Cr, Fe, Mg, Mn, Ni, Si, V and Zn.

The interlayer may comprise a lower proportion of soft-phase material than the first overlay layer.

The soft-phase material may comprise one or more element selected from a group of elements consisting of Bi, Cd, In Pb and Sn.

The matrix may comprise material selected from a group of elements consisting of Al, Ag or Cu and alloys of these metals.

The mean average grain size in the second overlay layer may be larger than the mean average grain size in the first overlay layer.

The soft-phase particles in the second overlay layer generally (i.e. over 95% of such particles) have a size in the range 0.5 to 6.0 µm (and preferably in the range 1.0 to 4.0 µm), measured perpendicular to the deposition growth direction, e.g. axially or circumferentially with respect to the axis of the bearing lining. The mean average grain size in the second overlay layer may be between 1.5 µm and 4.0 µm (e.g. approximately 2.2 µm).

The soft-phase particles in the first overlay layer generally (i.e. over 95% of such particles) have a size in the range 0.1 to 1.5 µm (and preferably in the range 0.3 to 1.0 µm), measured perpendicular to the deposition growth direction, e.g. axially or circumferentially with respect to the axis of the bearing lining. The mean average grain size in the first overlay layer is between 0.5 µm and 1.0 µm (e.g. approximately 0.7 µm).

A bearing substrate layer may be provided on the bearing backing layer between the bearing backing layer and the coating.

The proportion of grain size reduction additive may be substantially uniform throughout the first overlay layer. The proportion of grain size reduction additive may be substantially uniform throughout the second overlay layer.

The first and second overlay layers may comprise regions of a composite overlay layer in which the proportion of grain reduction additive decreases with increasing separation from the bearing backing layer.

The first overlay layer may comprise 25 to 35% wt Sn, 0.5 to 1.5% wt Cu, 1.5 to 2.5% wt Fe, up to 1% other elements (e.g. impurities), with the balance to 100% wt being Al, and the second overlay layer may comprise 25 to 35% wt Sn, 0.5 to 1.5% wt Cu, up to 1% other elements (e.g. impurities), with the balance to 100% wt being Al, and optionally an interlayer may comprise 5.5 to 7% wt Sn, 0.7 to 1.3% wt Cu, 0.7 to 1.3% wt Ni, 1.5 to 3.0% wt Si, up to 1% other elements (e.g. impurities), with the balance to 100% wt being Al,

BRIEF DESCRIPTION OF THE DRAWINGS

Embodiments of the invention are further described hereinafter with reference to the accompanying drawings, in which.

DETAILED DESCRIPTION

Like numbers refer to like elements throughout. The chemical notation AB(X) has been used to indicate a material comprising X % by weight of B, and the balance (i.e. 100-X % by weight) of A.

Figure 1:
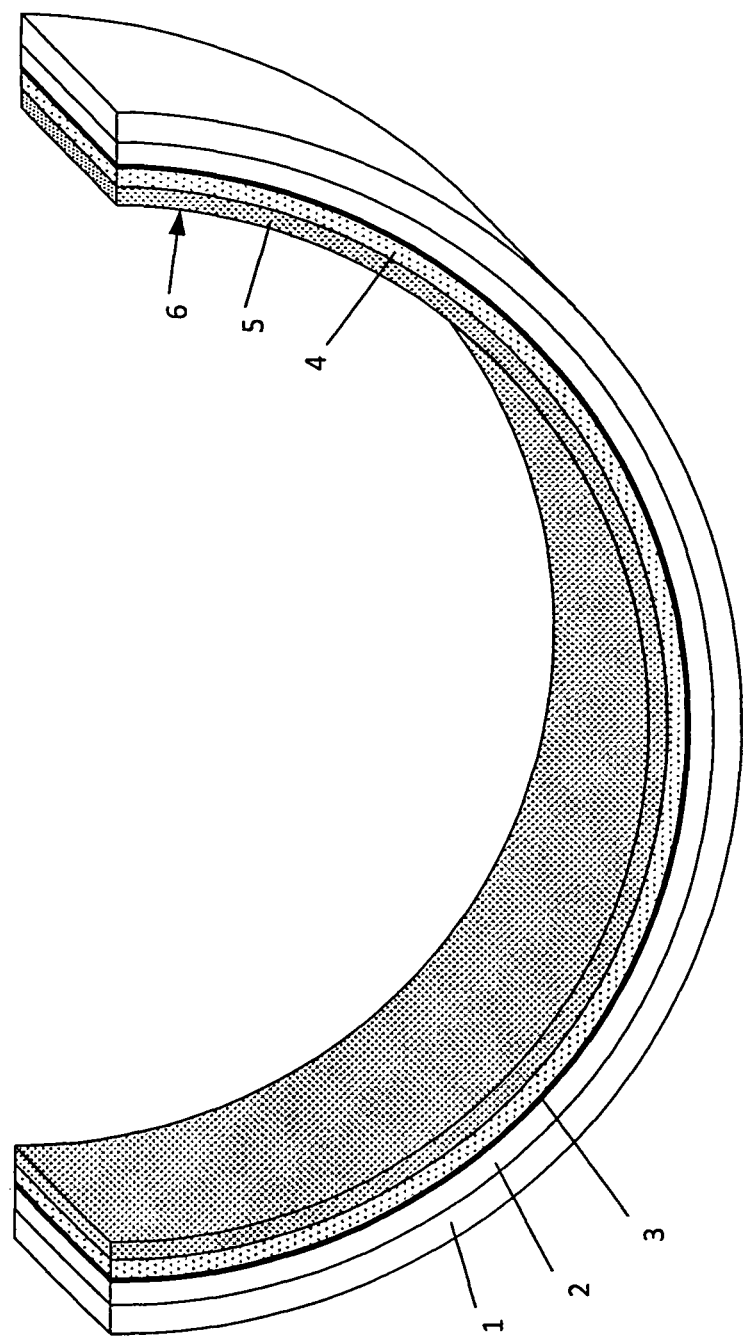
FIG. 1 illustrates a half-shell (semi-cylindrical) bearing lining according to the present invention.

FIG. 1 shows a schematic (not to scale) illustration of a half-shell (hollow semi-cylindrical) journal bearing lining comprising a bearing backing layer 1 and a bearing substrate layer 2, coated with a coating of layers comprising an interlayer 3 (optional), a first overlay layer 4, and a second overlay layer 5. The bearing lining is manufactured by the deposition of layers onto the bearing substrate layer 2 by a sputter coating process, with the upper surface (i.e. the free surface) of the final coating layer 5 providing the initial running surface 6 of the bearing lining.

An example of the composition and thickness of the materials of each layer is detailed in the following table:

| Layer | Thickness | Material (% of total by weight) |
| --- | --- | --- |
| Second overlayer 5 | 4 μm | AlSn(30)Cu(1) |
| First overlayer 4 | 8 μm | AlSn(30)Cu(1)Fe(2) |
| Interlayer 3 | 2 μm | AlSn(6)Cu(1)Ni(1)Si(2) |
| Bearing substrate layer 2 | 100-800 μm | Cu, Cu-based alloy, Al, Al-based alloy, or AlCu-based alloy |
| Bearing backing layer 1 | $1.0$-$3.0 \times 10^3$ μm | Steel |

The second (upper) overlayer layer 5 has a 30% wt proportion of tin. The tin provides particles of soft-phase material that is insoluble in the aluminium-copper matrix, with the soft-phase particles being distributed throughout the matrix (which may be an alloy or an intermetallic), and producing relatively large soft-phase particles. The soft-phase particles in the second overlay layer 5 typically have shapes that are wider than they are thick, with respect to the growth direction of the coating (perpendicular to the running surface). The soft-phase particles in the second overlay layer 5 generally (i.e. over 95% of such particles) have a size in the range 0.5 to 6.0 μm (and preferably in the range 1.0 to 4.0 μm), with a mean average size in the range 1.5 to 4.0 μm (e.g. approximately 2.2 μm), measured perpendicular to the deposition growth direction, e.g. axially or circumferentially with respect to the axis of the bearing lining. The tribological properties of the second overlay layer 5 are determined by the matrix material and the soft-phase particles distributed throughout the matrix material. The soft-phase material functions as a solid lubricant. Additionally, such a layer has high conformability, making it particularly suitable to accept the embedding of waste particles present between the bearing lining and a journaled shaft.

The first (lower) overlay layer 4 has the same proportion of tin, 30% wt as the second overlay layer 5. However, the first overlay layer 4 additionally comprises 2% wt of iron, which functions as a grain size reduction additive. The grain size reduction additive causes both the aluminium-copper-matrix and the soft-phase (tin) to be deposited with a smaller grain size, i.e. with smaller soft-phase particles that are more finely distributed throughout the matrix. The soft-phase particles in the first overlay layer 4 also typically have shapes that are wider than they are thick, with respect to the growth direction of the coating (perpendicular to the running surface). The soft-phase particles in the first overlay layer 4 generally (i.e. over 95% of such particles) have a size in the range 0.1 to 1.5 μm (and preferably in the range 0.3 to 1.0 μm), with a mean average size in the range 0.5 to 1.0 μm (e.g. approximately 0.7 μm), measured perpendicular to the deposition growth direction, e.g. axially or circumferentially with respect to the axis of the bearing lining. The grain size reduction additive may be distributed within the aluminium matrix material as a metastable crystalline phase.

Advantageously, provision of a smaller grain size results in increased wear resistance, so that the first overlay layer 4 has a higher wear resistance than the second overlay layer 5. Accordingly, in the case that the second overlay layer 5 has been worn away in use (e.g. in use with a journaled shaft) the subsequent rate of wear of the first overlay layer 4 is lower than that of the second overlay layer 5.

The (optional) interlayer 3 also comprises a grain size reduction additive, in this case being provided by the nickel, and the grain size of the soft-phase particles in the interlayer is substantially the same as that in the first overlay layer 4. Again, the grain size reduction additive may be distributed within the matrix material as a metastable crystalline phase.

A lower proportion of the soft-phase material (e.g. tin) is provided in the interlayer 3 than in the overlay layers 4 and 5, which provides an increased hardness of the interlayer. Accordingly, in the event that action of a journaled crankshaft (or other component) should have worn through both the overlay layers 4 and 5, the interlayer 3 will provide a further enhanced wear resistance in future operation.

Additional layers may be provided between the interlayer (or first overlay layer, in the case that the interlayer is omitted) and the bearing substrate layer. In particular, a diffusion blocking layer, such as a layer of nickel-chrome alloy, may be provided to prevent diffusion of the soft-phase (e.g. tin) into other layers, such as the bearing substrate layer, as well as to provide enhanced adhesion of the other coating layers to the backing substrate layer. However, advantageously, by use of an interlayer having a low proportion of soft-phase (e.g. tin) problems caused by diffusion of the soft-phase away from the overlay may be reduced to a sufficient extent that the diffusion blocking layer may be omitted.

Additionally, the bearing lining may be provided with a sacrificial surface layer (not shown) on the second overlay layer, which may be abraded during an initial "running in" phase of operation of the engine. The sacrificial surface layer may be selected from materials known to have desirable bearing properties, and which include, for example, lead, tin, cadmium, antimony, bismuth, indium and alloys of these metals, or a resin-based material. However, advantageously, the performance of the second overlay layer 4 may be such that a sacrificial surface layer is not required.

The coating layers may each comprise up to 1% wt of other elements by way of impurities.

Figure 2A:
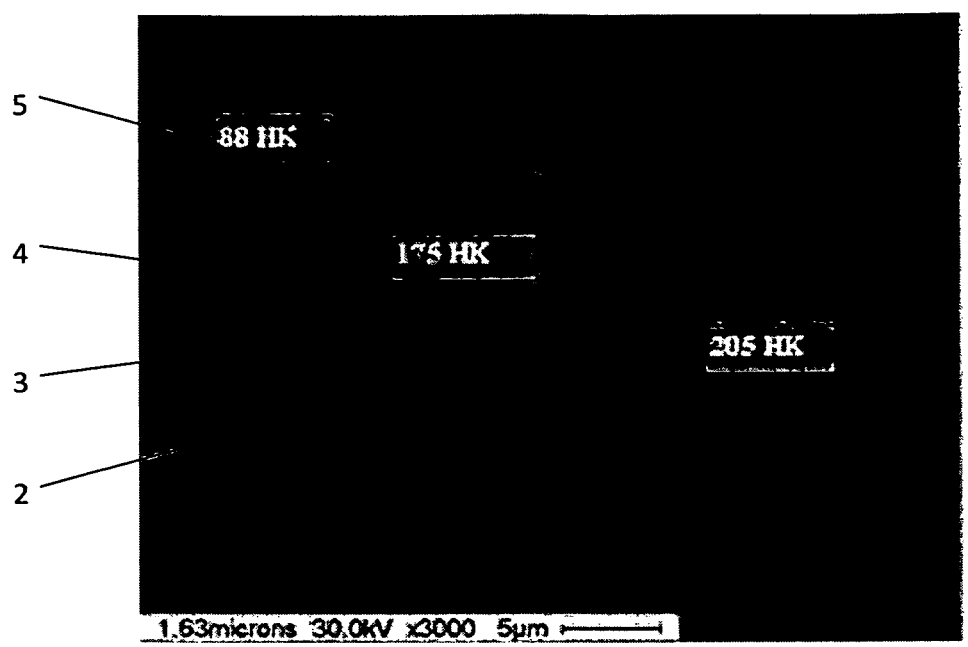
FIGS. 2A and 2B show scanning electron microscope images of part of a bearing lining according to FIG. 1.
Figure 2B:
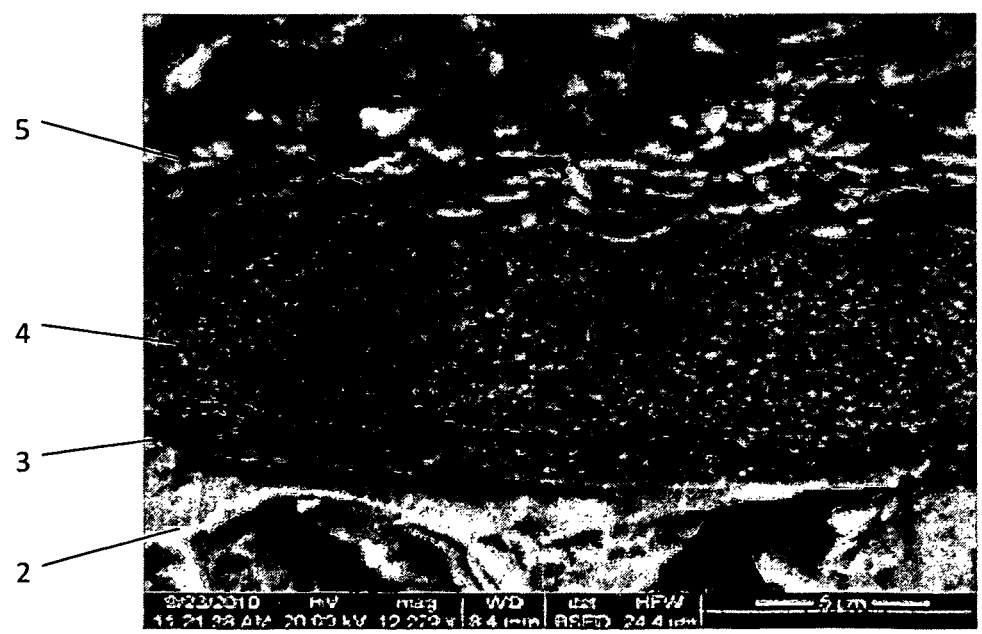

FIGS. 2A and 2B show scanning electron microscope images at two different levels of magnification of cross-sections through a bearing lining as described in FIG. 1, from which the size of the soft-phase grains (light coloured tin grains in a dark coloured aluminium-based matrix) can be seen to be larger in the second overlay layer 5 than in the first overlay layer 4. Conveniently, the grain size distribution in the interlayer 3 is approximately the same as that in the first overlay layer 4, which provides a good wear resistance in case the upper layers are worn away with a smooth wear performance transition, good bonding between the layers 3 and 4, as well as good bonding of the interlayer 3 to the substrate 2.

The coatings illustrated in FIGS. 1, 2A and 2B were produced by the method described below.

Sputter targets and mild steel bearing backing layers having both an AlCu-based alloy layer and then a Ni—Cr layer on the inner surface (i.e. upper, deposition surface) were placed into the chamber of a cathodic sputtering apparatus. High purity argon gas is used within the chamber, which was pumped down to between $3.5 \times 10^{-3}$ and $4.5 \times 10^{-3}$ mbar. The bearing backing was cooled to maintain the surface onto which sputtered material was deposited below 120° C., and preferably in a temperature range of 90 to 115° C.

Firstly, a 2 μm interlayer was deposited by sputtering an AlSn(6)Cu(1)Ni(1)Si(2) target. Secondly, 8 μm first overlay layer was deposited by sputtering a composite target of an AlSn(30)Cu(1) target with a pure Fe insert within the main erosion area, producing a deposited layer of AlSn(30)Cu(1)Fe(2). Alternatively the first overlay layer could be deposited using a uniform AlSn(30)Cu(1)Fe(2) target. Thirdly, the 4 μm second overlay layer was deposited by sputtering an AlSn(30)Cu(1) target.

In an alternative embodiment, the first and second overlay layers may be regions of a composite overlay layer, in which the proportion of grain size reduction additive is reduced during deposition (being monotonically varied in a graduated or continuously varied manner). Such a composite overlay layer may conveniently be deposited using a plurality of different sputter targets by varying the relative proportions of the material that is deposited onto the bearing lining from each sputter target.

Measurement of the wear resistance of the bearing coating made according to the present invention, on industry standard test machines, shows that the sputtered layer has a significantly enhanced wear resistance relative to corresponding bearings without the grain size reduction additive, accordingly providing enhanced wear performance, whilst maintaining a high level of conformability in the second overlay layer, being particularly advantageous for engines in which bearing wear is particularly high, such as engines configured for stop-start operation.

The terms "lower" and "upper" have been used to describe regions that are closer and further from the bearing backing layer, corresponding to lower regions being deposited before upper regions in the case of a coating deposited by sputter deposition. The term "running surface" has been used to describe the uppermost surface of a coating.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A bearing lining having a bearing backing layer provided with a coating comprising a first overlay layer and a second overlay layer, the first overlay layer being provided between the bearing backing layer and the second overlay layer, the first and second overlay layers each comprising a matrix material and a soft-phase material that is substantially insoluble in the matrix and dispersed within the matrix as soft-phase particles, and wherein the first overlay layer comprises a higher proportion by weight of a grain size reduction additive than the second overlay layer, wherein the second overlay layer comprises substantially no grain size reduction additive.

2. The bearing lining according to claim 1, wherein the proportion of soft-phase material by weight in each of the first and second overlay layers is less than the proportion by weight of the matrix material.

3. The bearing lining according to claim 1, wherein the grain size reduction additive is at least one element selected from a group of elements consisting of Co, Cr, Fe, Mg, Mn, Ni, Si, V and Zn.

4. The bearing lining according to claim 1, wherein an interlayer is provided between the bearing backing layer and the first overlay layer.

5. A The bearing lining according to claim 4, wherein the interlayer comprises a matrix and a soft-phase element that is substantially insoluble in the matrix and dispersed within the matrix as soft-phase particles.

6. The bearing lining according to claim 5, wherein the interlayer comprises the same grain size reduction additive as the first overlay layer.

7. The bearing lining according to claim 5, wherein the interlayer comprises a particle grain size reduction additive that is at least one element selected from a group of elements consisting of Co, Cr, Fe, Mg, Mn, Ni, Si, V and Zn.

8. The bearing lining according to claim 4, wherein the interlayer comprises a lower proportion of soft-phase material than the first overlay layer.

9. The bearing lining according to claim 1, wherein the soft-phase material comprises at least one element selected from a group of elements consisting of Bi, Cd, In, Pb, Sb and Sn.

10. The bearing lining according to claim 1, wherein the matrix comprises material selected from a group of elements consisting of Al, Ag or Cu and alloys of these metals.

11. The bearing lining according to claim 1, wherein a bearing substrate layer is provided on the bearing backing layer between the bearing backing layer and the coating.

12. The bearing lining according to claim 1, wherein the proportion of grain size reduction additive is substantially uniform throughout the first overlay layer.

13. The bearing lining according to claim 1, wherein the first and second overlay layers comprise regions of a composite overlay layer in which the proportion of grain reduction additive decreases with increasing separation from the bearing backing layer.

14. A vehicle engine comprising a bearing lining according to claim 1.

15. A bearing lining having a bearing backing layer provided with a coating comprising a first overlay layer and a second overlay layer, the first overlay layer being provided between the bearing backing layer and the second overlay layer, the first and second overlay layers each comprising a matrix material and a soft-phase material that is substantially insoluble in the matrix and dispersed within the matrix as soft-phase particles, and wherein the first overlay layer comprises a higher proportion by weight of a grain size reduction additive than the second overlay layer, wherein the proportion of soft-phase material by weight in the first overlay layer is the same as or lower than the proportion of soft-phase material by weight in the second overlay layer.

16. A bearing lining having a bearing backing layer provided with a coating comprising a first overlay layer and a second overlay layer, the first overlay layer being provided between the bearing backing layer and the second overlay layer, the first and second overlay layers each comprising a matrix material and a soft-phase material that is substantially insoluble in the matrix and dispersed within the matrix as soft-phase particles, and wherein the first overlay layer comprises a higher proportion by weight of a grain size reduction additive than the second overlay layer, wherein the mean average grain size in the second overlay layer is larger than the mean average grain size in the first overlay layer.

17. The bearing lining according to claim 16, wherein the mean average grain size in the second overlay layer is between 1.5 µm and 4.0 µm, and the mean average grain size in the first overlay layer is between 0.5 µm and 1.0 µm.

18. The bearing lining according to claim 16, wherein the proportion of grain size reduction additive is substantially uniform throughout the second overlay layer.

19. A bearing lining having a bearing backing layer provided with a coating comprising a first overlay layer and a second overlay layer, the first overlay layer being provided between the bearing backing layer and the second overlay layer, the first and second overlay layers each comprising a matrix material and a soft-phase material that is substantially insoluble in the matrix and dispersed within the matrix as soft-phase particles, and wherein the first overlay layer comprises a higher proportion by weight of a grain size reduction additive than the second overlay layer, wherein the first overlay layer comprises 25 to 35% wt Sn, 0.5 to 1.5% wt Cu, 1.5 to 2.5% wt Fe, up to 1% other elements, with the balance to 100% wt being Al, and the second overlay layer comprises 25 to 35% wt Sn, 0.5to 1.5% wt Cu, up to 1% other elements, with the balance to 100% wt being Al, and optionally an interlayer comprising 5.5 to 7% wt Sn, 0.7 to 1.3% wt Cu, 0.7 to 1.3% wt Ni, 1.5 to 3.0% wt Si, up to 1% other elements, with the balance to 100% wt being Al.

* * * * *